United States Patent
Leone et al.

(10) Patent No.: US 10,145,728 B2
(45) Date of Patent: *Dec. 4, 2018

(54) RECEPTION AND TRANSMISSION CIRCUIT FOR A CAPACITIVE MICROMACHINED ULTRASONIC TRANSDUCER

(71) Applicant: STMicroelectronics S.r.l., Agrate Brianza (IT)

(72) Inventors: Antonio Davide Leone, Pieve Emanuele (IT); Davide Ugo Ghisu, Milan (IT); Fabio Quaglia, Pizzale (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 562 days.

This patent is subject to a terminal disclaimer.

(21) Appl. No.: 14/750,312

(22) Filed: Jun. 25, 2015

(65) Prior Publication Data

US 2016/0076933 A1 Mar. 17, 2016

(30) Foreign Application Priority Data

Sep. 15, 2014 (IT) .............................. TO2014A0728

(51) Int. Cl.
*G01S 7/52* (2006.01)
*G01H 11/06* (2006.01)
(Continued)

(52) U.S. Cl.
CPC ........... *G01H 11/06* (2013.01); *B06B 1/0207* (2013.01); *G01S 7/52019* (2013.01);
(Continued)

(58) Field of Classification Search
CPC . G01H 11/06; G01S 7/52019; G01S 7/52023; G10K 11/18; B06B 1/0207; B06B 2201/51; B06B 2201/76
(Continued)

(56) References Cited

U.S. PATENT DOCUMENTS

| | | | |
|---|---|---|---|
| 4,274,056 A | * | 6/1981 | Lukes .................... G01R 17/00 327/336 |
| 4,918,341 A | | 4/1990 | Galbraith |

(Continued)

FOREIGN PATENT DOCUMENTS

| | | |
|---|---|---|
| CN | 102668380 A | 9/2012 |
| CN | 205092962 U | 3/2016 |

(Continued)

OTHER PUBLICATIONS

Chinese Search Report, dated Apr. 24, 2017, for Chinese Application No. 2015105838819, 2 pages.

(Continued)

*Primary Examiner* — Daniel L Murphy
(74) *Attorney, Agent, or Firm* — Seed IP Law Group LLP

(57) ABSTRACT

Described herein is a transceiver circuit for a capacitive micromachined ultrasonic transducer (CMUT), provided with: a transmitter stage, which generates excitation pulses for a first node of the CMUT transducer during a transmitting phase, a second node of the CMUT transducer being coupled to a biasing voltage; a receiver stage that is selectively coupled to the first node during a receiving phase and has an amplification stage; a switching stage that couples the receiver stage to the first node during the receiving phase and decouples the receiver stage from the first node during the transmitting phase. The amplification stage is provided with a charge amplifier that has an input terminal and is biased as a function of a biasing voltage; and the switching stage is coupled to the same biasing voltage thereby minimizing an injection of charge into the input terminal upon switching from the transmitting phase to the receiving phase.

24 Claims, 5 Drawing Sheets

(51) Int. Cl.
  *G10K 11/18* (2006.01)
  *B06B 1/02* (2006.01)
(52) U.S. Cl.
  CPC .......... *G01S 7/52023* (2013.01); *G10K 11/18* (2013.01); *B06B 2201/51* (2013.01); *B06B 2201/76* (2013.01)
(58) Field of Classification Search
  USPC ............................................ 367/7, 135, 181
  See application file for complete search history.

(56) References Cited

U.S. PATENT DOCUMENTS

| | | | |
|---|---|---|---|
| 5,832,923 | A | 11/1998 | Engeler et al. |
| 6,677,807 | B1 | 1/2004 | Brokaw |
| 7,967,754 | B2* | 6/2011 | Knight ................ A61B 8/12 600/443 |
| 8,315,125 | B2 | 11/2012 | Lemmerhirt |
| 8,488,812 | B2* | 7/2013 | David ................ G05F 1/467 381/111 |
| 2005/0154300 | A1 | 7/2005 | Wodnicki et al. |
| 2006/0061231 | A1 | 3/2006 | Kameishi |
| 2013/0265855 | A1 | 10/2013 | Ghisu et al. |
| 2014/0159702 | A1* | 6/2014 | Doege ................ H01L 27/14643 324/76.13 |
| 2014/0288428 | A1 | 9/2014 | Rothberg et al. |
| 2015/0091646 | A1 | 4/2015 | Shifrin |

FOREIGN PATENT DOCUMENTS

| | | |
|---|---|---|
| DE | 3618222 A1 | 12/1987 |
| DE | 10 2012 014 197 A1 | 1/2014 |

OTHER PUBLICATIONS

Sautto et al., "A CMUT Transceiver Front-End with 100-V TX Driver and 1-mW Low-Noise Capacitive Feedback RX Amplifier in BCD-SOI Technology," 40$^{th}$ European Solid State Circuits Conference (ESSCIRC), ESSCIRC 2014, Venice Lido, Sep. 22-26, 2014, pp. 407-410.

Savoia et al., "An Ultra-Low-Power Fully Integrated Ultrasound Imaging CMUT Transceiver Featuring a High-Voltage Unipolar Pulser and a Low-Noise Charge Amplifier," 2014 IEEE International Ultrasonics Symposium (IUS), Chicago, IL, Sep. 3-6, 2014, pp. 2568-2571.

Yamaner et al., "Front-end IC Design for Intravascular Ultrasound Imaging," Ph.D. Research in Microelectronics and Electronics, Istanbul, Jun. 22, 2008, pp. 257-260.

Zhao et al., "High-voltage Pulser for Ultrasound Medical Imaging Applications," 2011 13$^{th}$ International Symposium on Integrated Circuits (ISIC), Singapore, Dec. 12-14, 2011, pp. 408-411.

Guinn et al., "Front-End Receiver Electronics for High-Frequency Monolithic CMUT-on-CMOS Imaging Arrays." IEEE Transaction on Ultrasonics, Ferroelectrics, and Frequency Control 58(8):1658-1669, 2011.

Italian Search Report and Written Opinion, dated Jun. 11, 2015, for corresponding IT Application No. TO20140729, 8 pages.

Palmisano et al., "A Replica Biasing for Constant-Gain CMOS Open-Loop Amplifiers," IEEE International Symposium on Circuits and Systems, May 31-Jun. 3, 1998, Monterey, CA, pp. 363-366.

Peng et al.. "A Charge-Based Low-Power High-SNR Capacitive Sensing Interface Circuit," IEEE Transactions on Circuits and Systems I: Regular Papers 55(7):1863-1873, 2008.

* cited by examiner

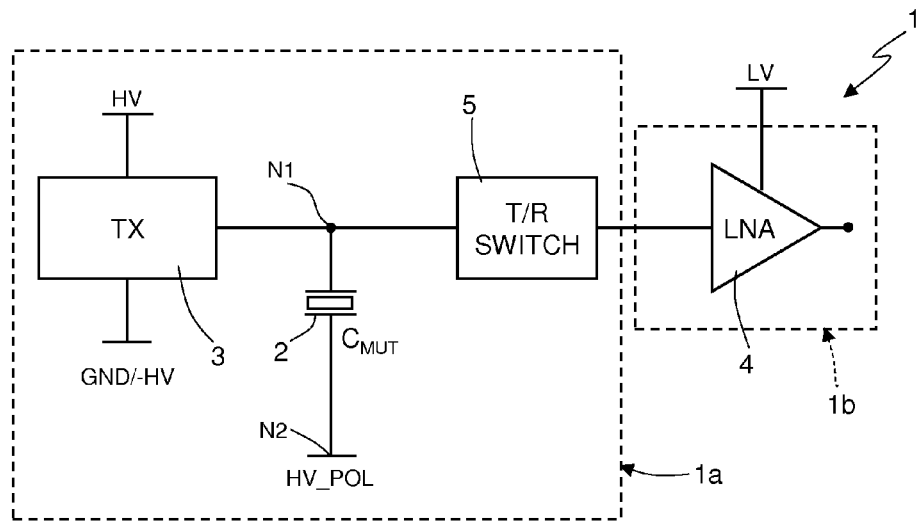
Fig.1 *(Prior Art)*
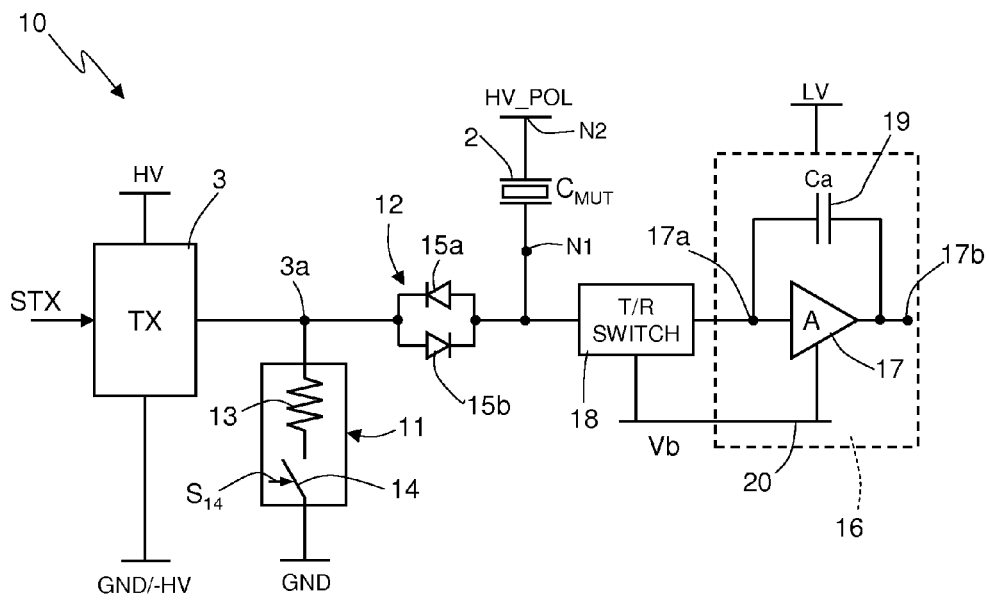
Fig.2

RECEPTION AND TRANSMISSION CIRCUIT FOR A CAPACITIVE MICROMACHINED ULTRASONIC TRANSDUCER

BACKGROUND

Technical Field

The present disclosure relates to a reception and transmission circuit for a capacitive micromachined ultrasonic transducer (CMUT).

Description of the Related Art

As is known, in the last few years, thanks to the developments in the field of micromachining of semiconductor materials, in particular silicon, the use of probes provided with arrays of micromachined ultrasonic transducers of a capacitive type (CMUTs) or piezoelectric type (PMUTs) has expanded.

The above transducers have extremely low consumption levels and enable, given the small dimensions, detection probes for 2D or 3D imaging to be obtained that are extremely compact and may, for example, be used in applications of medical diagnostics (in medical ultrasonographic scanners or ultrasonic tomography scanners), for example coupled to probes for intravascular diagnostics, affording important advantages in terms of portability and flexibility of use to be achieved.

Of course, there may be a wide range of further uses, even in the non-clinical field, for example for monitoring the conditions of integrity or manufacturing quality of mechanical elements to be tested or monitored.

The use of an array, constituted by an orderly arrangement, whether unidimensional, two-dimensional, or three-dimensional, of a plurality of ultrasonic transducers, facilitates processing of the signals acquired for the corresponding imaging operations.

The use of CMUT transducers may have certain advantages over the use of piezoelectric transducers, amongst which the possibility of full integration with the corresponding transmission and reception circuit.

The individual CMUT transducers may in fact be obtained in an integrated manner in one or more dice of semiconductor material, and include a membrane that faces a substrate and is able to undergo bending, during the transmitting phase, as a function of an excitation signal applied by a transmission circuit, thus generating acoustic waves that are transmitted in the surrounding environment; or, during the receiving phase, as a function of detected acoustic waves, thus generating a variation of the resulting capacitance, which may be read by a reading circuit.

The die integrating the CMUT transducer may then be coupled, for example using the flip-chip technique, to at least one further die integrating the transmission and reception circuit (including a plurality of transceiver channels, one for each CMUT), within a single package, which is compact and occupies a small space.

The integration of the transmission and reception circuits may, for example, be obtained, in an economically advantageous manner, with BCD SOI techniques, facilitating reduction of the associated power consumption.

As an alternative, each transmission circuit, and a corresponding distinct reception circuit, may be integrated in respective dice of semiconductor material, for example for separately optimizing the performance and the manufacturing techniques of the two circuits. In any case, advantageously, both dice may be housed in a same package.

In greater detail, two main techniques are known for driving a CMUT transducer, and thus for designing the associated transceiver circuit, according to whether the transducer is provided with a single electrode that is individually accessible (from the outside of the corresponding die) or with both electrodes that are individually accessible (once again, from the outside of the corresponding die).

In the former case, in a corresponding array of transducers, the bottom electrodes of the CMUT transducers are connected together, at the bottom (non-accessible underside of the die), whereas for each CMUT transducer the top electrode is available at the front (accessible upper side of the die). In the latter case, both of the electrodes are available individually for each transducer on the front of the die, at the cost, however, of a complication in the manufacturing of the same transducers and of the corresponding electrical interconnections.

BRIEF SUMMARY

In an embodiment, a transceiver circuit for a capacitive micromachined ultrasonic transducer comprises: a transmitter stage, configured to generate an excitation signal for a first node of the transducer during a transmitting phase, a second node of said transducer being coupled to a biasing voltage; a receiver stage that may be selectively coupled to said first node during a receiving phase and comprises an amplification stage; and a switching stage, configured to couple the receiver stage to said first node during the receiving phase and decouple the receiver stage from said first node during the transmitting phase, wherein said amplification stage includes a charge amplifier having an input terminal and biased as a function of a biasing voltage; and in that said switching stage is coupled to said biasing voltage minimizing an injection of charge into said input terminal upon switching from said transmitting phase to said receiving phase. In an embodiment, the circuit comprises: a decoupling and disturbance-suppression block, which is set between an output terminal of said transmitter stage and said first node and is configured to decouple the transmitter stage from said first node during the receiving phase; and a biasing block coupled to said output terminal and configured to set the voltage of said output terminal at a reference voltage value during said receiving phase. In an embodiment, said decoupling and disturbance-suppression block comprises a couple of diode elements in antiparallel configuration, connected between said output terminal and said first node, both biased in the absence of conduction during said receiving phase. In an embodiment, said biasing block comprises a switch element and a high-impedance element, connected in series between said output terminal and a line set at said reference voltage; said switch element being driven into the open condition during said transmitting phase and into the closed condition during said receiving phase. In an embodiment, said switching stage is configured to define an intermediate node, which may be selectively connected to said input terminal during the receiving phase, and to precharge said intermediate node at a precharge voltage, as a function of said biasing voltage, before said intermediate node is coupled to said input terminal during said receiving phase. In an embodiment, said switching stage comprises: a first switch controllable for selectively connecting the first node to the intermediate node; a second switch controllable for selectively connecting the intermediate node to the input terminal of the charge amplifier of the amplification stage; a generator block, configured to generate the precharge voltage, as a function of said biasing voltage; and a third switch, which has a first terminal connected to the reference voltage and a second terminal connected to the intermediate node via the generator block, and is controllable for enabling generation of the precharge voltage at the intermediate node. In an embodiment, the amplification stage has a biasing-current generator, coupled to the biasing voltage and designed to supply a biasing current, the amplification stage being configured to have an operating voltage on the input terminal in response to the biasing current; and wherein the generator block comprises: a precharge-current generator, which is coupled in a precharge relation to the biasing generator and is designed to supply a precharge current, the generator block being configured to provide a precharge voltage on the intermediate node in response to the precharge current, said precharge voltage having a set relation with said operating voltage. In an embodiment, said amplification stage includes a first transistor, which is coupled to the biasing-current generator for receiving the biasing current and has a control terminal coupled to the input terminal, and a first aspect ratio; and wherein said generator block comprises a fourth switch, connected between the intermediate node and the precharge-current generator, which is controllable for enabling generation of said precharge voltage; and a second transistor, coupled to the precharge-current generator for receiving the precharge current, which is mirrored with respect to the biasing current via a mirror ratio, and has a control terminal coupled to the intermediate node and a second aspect ratio; wherein the second aspect ratio is a multiple of the first aspect ratio, which is a function of the mirror ratio. In an embodiment, the charge amplifier of the amplification stage includes a feedback capacitor connected between an output terminal and the input terminal. In an embodiment, the transmitter stage operates at a first voltage and the receiver stage operates at a second voltage, lower than the first voltage; and wherein the switching stage is configured to protect the receiver stage from the first voltage in the transmitter stage. In an embodiment, the biasing voltage on the second node of said transducer has a value that may be varied from outside, and independently of, said transceiver circuit. In an embodiment, an electronic device is used in ultrasonography or ultrasonic tomography.

In an embodiment, a device comprises: a transmitter configured to generate an excitation signal for a first node of a transducer during a transmitting phase, a second node of said transducer being coupled to a biasing voltage terminal; a receiver including a charge amplifier having an input terminal and biased as a function of an amplifier biasing voltage; and switching circuitry coupled to the amplifier biasing voltage and configured to: generate a pre-charge biasing voltage based on the amplifier biasing voltage during a pre-charge phase; couple the receiver to said first node during a receiving phase; and decouple the receiver from said first node during the transmitting phase. In an embodiment, the device comprises: decoupling circuitry coupled between an output terminal of said transmitter and said first node and configured to decouple the transmitter from said first node during the receiving phase; and transmitter biasing circuitry coupled to said output terminal and configured to set a voltage of said output terminal to a reference voltage value during said receiving phase. In an embodiment, said decoupling circuitry comprises a pair of diodes in antiparallel configuration, connected between said output terminal and said first node and biased during said receiving phase. In an embodiment, said transmitter biasing circuitry comprises a switch and a high-impedance element, connected in series between said output terminal and a line set at said reference voltage, said switch being configured to open during said transmitting phase and to close during said receiving phase. In an embodiment, said switching circuitry comprises an intermediate node and is configured to charge the intermediate node to the pre-charge biasing voltage during the pre-charge phase and to couple the amplifier input terminal to the intermediate node during the receiving phase. In an embodiment, said switching circuitry comprises: a first switch configured to selectively coupled the first node to the intermediate node; a second switch configured to selectively couple the intermediate node to the input terminal of the charge amplifier; a biasing-voltage generator coupled to the intermediate node and configured to generate the pre-charge biasing voltage based on said amplifier biasing voltage; and a third switch coupled between a reference voltage terminal and the biasing-voltage generator and configured to selectively activate the biasing-voltage generator during the pre-charge phase. In an embodiment, the receiver comprises a biasing-current generator coupled to the biasing voltage and configured to supply a biasing current, wherein the charge amplifier is configured to generate an operating voltage on the input terminal based on the biasing current; and the biasing-voltage generator comprises: a pre-charge-current generator, which is coupled to the biasing generator and configured to supply a pre-charge current, wherein the biasing-voltage generator is configured to provide the pre-charge biasing voltage on the intermediate node based on the pre-charge current, said pre-charge biasing voltage having a pre-set relation with said operating voltage. In an embodiment, said charge amplifier includes a first transistor coupled to the biasing-current generator to receive the biasing current and having a control terminal coupled to the input terminal, and a first aspect ratio; and said biasing-voltage generator comprises a fourth switch coupled between the intermediate node and the pre-charge-current generator, and a second transistor, coupled to the pre-charge-current generator to receive the pre-charge current, which is mirrored with respect to the biasing current via a mirror ratio, the second transistor having a control terminal coupled to the intermediate node and a second aspect ratio, wherein the second aspect ratio is a multiple of the first aspect ratio, the multiple being a function of the mirror ratio. In an embodiment, the charge amplifier includes a feedback capacitor coupled between an output terminal of the charge amplifier and the input terminal of the charge amplifier. In an embodiment, the transmitter operates at a first voltage and the receiver operates at a second voltage, lower than the first voltage, and the switching circuitry is configured to protect the receiver stage from the first voltage in the transmitter stage. In an embodiment, the biasing voltage terminal is configured to receive a voltage from an external source. In an embodiment, said switching circuitry comprises an intermediate node and is configured to charge the intermediate node to the pre-charge biasing voltage during the pre-charge phase and to couple the amplifier input terminal to the intermediate node during the receiving phase.

In an embodiment, a system comprises: an ultrasonic probe including a plurality of transducers arranged in an array and a corresponding plurality of transceiver circuits, each transceiver circuit having: a transmitter configured to generate an excitation signal for a first node of a transducer during a transmitting phase, a second node of said transducer being coupled to a biasing voltage terminal; a receiver including a charge amplifier having an input terminal and biased as a function of an amplifier biasing voltage; and switching circuitry coupled to the amplifier biasing voltage and configured to: generate a pre-charge biasing voltage based on the amplifier biasing voltage during a pre-charge phase; couple the receiver to said first node during a receiving phase; and decouple the receiver from said first node during the transmitting phase; and a controller configured to the timing of the receiving and transmitting phases of each of said transceiver circuits. In an embodiment, each transceiver circuit comprises: decoupling circuitry coupled between an output terminal of the transmitter and the first node and configured to decouple the transmitter from the first node during the receiving phase of the respective transceiver; and transmitter biasing circuitry coupled to the output terminal and configured to set a voltage of the output terminal to a reference voltage value during the receiving phase of the respective transceiver. In an embodiment, the system is configured to perform at least one of ultrasonography and ultrasonic tomography.

In an embodiment, a method comprises: transmitting an excitation signal of a transmitter to a first node of a transducer during a transmitting phase, a second node of said transducer being coupled to a biasing voltage terminal; biasing a charge amplifier of a receiver as a function of an amplifier biasing voltage, the charge amplifier having an input terminal; generating a pre-charge biasing voltage based on the amplifier biasing voltage during a pre-charge phase; coupling the receiver to said first node during a receiving phase; and decoupling the receiver from said first node during the transmitting phase. In an embodiment, the method comprises: decoupling an output of the transmitter from said first node during the receiving phase; and clamping a voltage of said output terminal to a reference voltage value during said receiving phase. In an embodiment, said clamping comprises controlling a switch coupling said output terminal to a reference voltage line through a high-impedance element. In an embodiment, the method comprises charging an intermediate node to the pre-charge biasing voltage during the pre-charge phase and coupling the amplifier input terminal to the intermediate node during the receiving phase. In an embodiment, the method comprises charging an intermediate node to the pre-charge biasing voltage during the pre-charge phase and coupling the amplifier input terminal to the intermediate node during the receiving phase.

In an embodiment, a non-transitory computer-readable medium's contents which configured a transducer system to perform a method, the method comprising: transmitting an excitation signal of a transmitter to a first node of a transducer of the transducer system during a transmitting phase, a second node of said transducer being coupled to a biasing voltage terminal; biasing a charge amplifier of a receiver as a function of an amplifier biasing voltage; generating a pre-charge biasing voltage based on the amplifier biasing voltage during a pre-charge phase; coupling the receiver to said first node during a receiving phase; and decoupling the receiver from said first node during the transmitting phase. In an embodiment, wherein the method comprises: decoupling an output of the transmitter from said first node during the receiving phase; and clamping a voltage of said output terminal to a reference voltage value during said receiving phase. In an embodiment, the method comprises charging an intermediate node to the pre-charge biasing voltage during the pre-charge phase and coupling an input terminal of the amplifier to the intermediate node during the receiving phase.

BRIEF DESCRIPTION OF THE SEVERAL VIEWS OF THE DRAWINGS

For a better understanding of the present disclosure, embodiments thereof are now described, purely by way of non-limiting example and with reference to the attached drawings, wherein:

FIG. 1 shows a schematic block diagram of a transceiver circuit for a CMUT transducer, of a known type;

FIG. 2 shows a block diagram of a transceiver circuit for a CMUT transducer, according to an embodiment;

DETAILED DESCRIPTION

Figure 3:
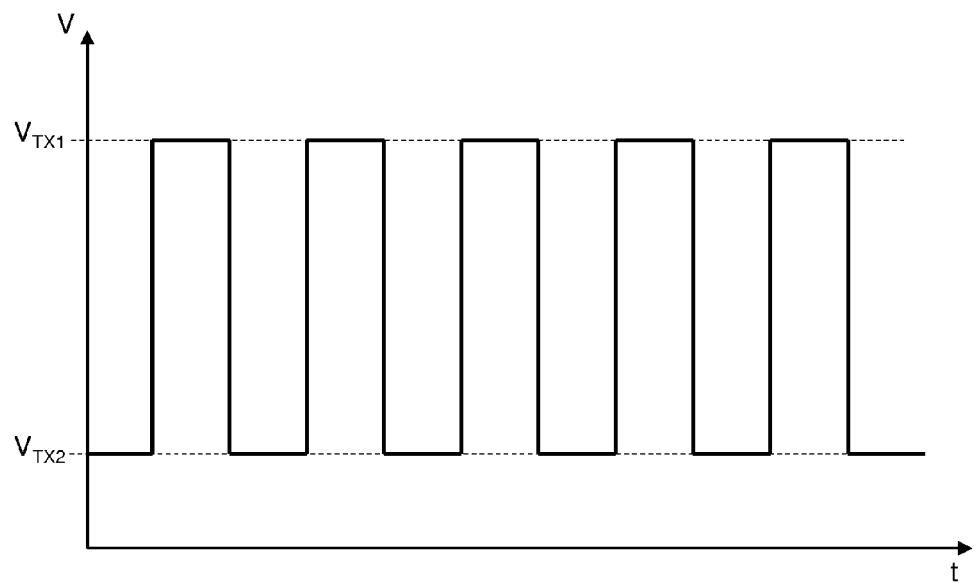
FIG. 3 is a plot of an electrical quantity in the circuit of FIG. 2.

In the present document, an embodiment is discussed wherein the CMUT transducers have a respective single electrode that is individually accessible.

FIG. 1 shows a circuit of a known type, designated as a whole by 1, which provides a transceiver circuit for driving a single-electrode CMUT, illustrated schematically and designated by 2 (in the case of an array of transducers, a plurality of similar transceiver circuits will be present, defining corresponding transceiver channels; FIG. 1 shows only one of said transceiver channels, by way of example).

The transceiver circuit 1 includes a transmitter stage 3, coupled to a first supply voltage HV (in the high-voltage range, for example of the order of 100V-200V), configured to generate suitable excitation pulses, for example in the form of pulse trains, for a first electrode, defining a first node N1 (accessible from the outside), of the CMUT transducer 2. A second electrode, defining a second node N2 of the same CMUT transducer 2, is biased, outside the die, at a reference voltage, or ground GND, or, as in the case illustrated, at an appropriate biasing voltage HV_POL (which is also in the high-voltage range, for example 50 V).

The transceiver circuit 1 further comprises a receiver stage 4, including a low-noise amplifier (LNA), which may be selectively connected to the first node N1 via a transmission/reception switching stage 5 (in what follows T/R switching stage 5).

The receiver stage 4 is coupled to a second supply voltage LV (in the low-voltage range, or with logic voltage values, for example of the order of 1V-5V, of a value much lower than the first supply voltage HV).

In particular, the T/R switching stage 5 is driven into a open condition during a transmitting phase, in which the transmitter stage 2 generates excitation pulses for biasing the CMUT transducer 2 (in this phase, the receiver stage 4 is decoupled from the first node N1), and is driven into a closed condition during a receiving phase, in which the receiver stage 4 is coupled to the first node N1 for receiving, and amplifying, electrical transduction signals, which are indicative of the acoustic waves received.

The transceiver circuit 1 may thus be divided into two blocks 1a, 1b: a first block 1a, which includes the transmitter stage 3 and the CMUT transducer 2 and operates at high voltage; and a second block 1b, which includes the receiver stage 4 and operates at low voltage.

The T/R switching stage 5 interfaces the first and second blocks 1a, 1b, and in particular protects the receiver stage 4 during the transmitting phase, for example from high voltage and from disturbance coming from the transmitter stage 3. The T/R switching stage 5 further couples the same receiver stage 4 to the CMUT transducer 2 during the receiving phase, to enable acquisition of the detected acoustic waves, for a subsequent processing thereof.

The majority of known circuit solutions envisage that the receiver stage 4 includes, as a first gain stage, a transresistance amplifier (TRA); by way of example, reference may be made to the following document:

Dongning Zhao; Meng Tong Tan; Hyouk-Kyu Cha; Jinli Qu; Yan Mei; Hao Yu; Basu, A.; Minkyu Je, "High-voltage pulser for ultrasound medical imaging applications", Integrated Circuits (ISIC), 2011, 13th International Symposium on Integrated Circuits, pp. 408, 411, 12-14 Dec. 2011, DOI: 10.1109/ISICir.2011.6131983.

The present Applicant has, however, realized that such a circuit configuration has some problems.

In particular, the resistor defining the gain of the transresistance amplifier (TRA) contributes in a fundamental manner to the noise of the transceiver circuit 1, may cause problems of stability, and is further likely to be the cause of mismatch between the various transceiver channels, in the case of a probe including an array of transducers and corresponding transceiver circuits.

The presence of this resistor further causes a considerable consumption of current and as a whole renders the design of an efficient T/R switching stage 5 particularly critical.

In place of the trans-resistance amplifier, the use of a charge amplifier has been proposed; in this regard, reference may be made, for example, to the following document:

Yamaner, F. Y.; Cenkeramaddi, L. R.; Bozkurt, A., "Frontend IC design for intravascular ultrasound imaging", Research in Microelectronics and Electronics, 2008, PRIME 2008, Ph.D., pp. 257, 260, June 2008, DOI: 10.1109/RME.2008.4595774.

However, the present Applicant has realized that also this further solution is not free from drawbacks, which do not enable full exploitation of its advantages.

In particular, the present Applicant has realized that the use of this type of amplifiers entails delays in the transition between the transmitting phase and the receiving phase, principally due to the injection of charge originating from switching of the T/R switching stage, which may alter the working point of the charge amplifier.

The charge amplifier itself has low biasing currents that make its transition slow, unless consumption is sacrificed to a significant extent.

In general, biasing of the charge amplifier is particularly critical for the performance of the transceiver circuit, especially in the case of transmission and reception channels in a probe including an array of transducers.

FIG. 2 shows an integrated transceiver circuit, designated as a whole by 10, for driving a CMUT transducer, designated once again by 2, according to an embodiment.

In a manner corresponding with what has been discussed previously, the CMUT transducer 2 has a first electrode defining a first node N1 designed to be connected alternatively in transmission or in reception, respectively to a transmitter stage or to a receiver stage; and a second electrode, which defines a second node N2, biased, for example from outside the die in which the CMUT transducer 2 is obtained, at a reference voltage GND or at an appropriate biasing voltage HV_POL (as in the example illustrated in FIG. 2).

In one embodiment, the first node N1 is accessible from the front of the die in which the CMUT transducer 2 is provided, whereas the second node N2 is provided on the back of the die.

In an embodiment, the value of the biasing voltage HV_POL may be selected appropriately according to the optimal biasing of the CMUT transducer 2, from outside the transceiver circuit 10, and in a way altogether independent thereof.

The transceiver circuit 10 includes a transmitter stage, once again designated by 3, configured to generate appropriate high-voltage excitation pulses at a frequency comprised, for example, between 2 MHz and 20 MHz, for the first node N1 of the CMUT transducer 2 during the transmitting phase, for example in the form of pulse trains; the transmitter stage 3 thus has an output 3a designed to be connected to the same first node N1 during the transmitting phase.

The transmitter stage 3 has a first supply input, which receives a first, positive, supply voltage HV (in the high-voltage range), and a second supply input coupled to a reference terminal, or ground, GND (in the case where the pulses generated are of a unipolar type), or to a negative supply voltage –HV (in the case where the pulses are of a bipolar type, e.g., comprised between –HV and +HV, with zero mean value).

As an alternative, the transmitter stage 3 may be configured (in a per se known manner, here not described in detail) for generating at output multilevel excitation voltages, for example having values corresponding to two, three, or more excitation levels, generated as a function of the first supply voltage HV.

Purely by way of example, FIG. 3 shows the plot of a train of pulses emitted by the transmitter stage 3, in the case of a unipolar configuration; the voltage V on the output terminal 3a oscillates between a first transmission voltage $VTX_1$, in the example equal to the first positive supply voltage HV, and a second transmission voltage $VTX_2$, in the example substantially equal to the reference voltage GND (but for the voltage drop across the diodes 15a, 15b; see the following description).

The transmitter stage 3 is further activated in a transmitting configuration by an external control unit (as will also be discussed hereinafter), by a transmission control signal STX, and otherwise deactivated.

In a way that will be evident for a person skilled in the field, the transmitter stage 3 may, for example, include a first MOS transistor and a second MOS transistor in push-pull configuration, which may be alternately driven for bringing the output terminal 3a to a voltage +HV or to a voltage –HV (or GND); deactivation of the transmitter stage 3, by the transmission control signal STX, may correspond to a floating state or three-state of the output 3a, where both of the transistors are in the open state.

In an embodiment, the transceiver circuit 10 further includes: a biasing block 11 connected between the output 3a of the transmitter stage 3 and the reference terminal GND; and a decoupling and disturbance-suppression block 12, connected between the same output 3a of the transmitter stage 3 and the first node N1 of the CMUT transducer 2.

In an embodiment, the biasing block 11 includes the series of a biasing resistor 13, having a high value of resistance, for example 1 MΩ, and a biasing switch 14, for example provided by a MOS transistor, controlled by an appropriate control signal $S_{14}$ (generated, for example, by the aforesaid control unit).

The decoupling and disturbance-suppression block 12 comprises a pair of diode elements 15a, 15b connected in antiparallel configuration (i.e., each diode has the anode/cathode terminal connected to the cathode/anode terminal of the other diode of the pair).

In use, during the transmitting phase, when the transmitter stage 3 is active, the biasing block 11 is deactivated (the biasing switch 14 is driven into the open state) to prevent any undesirable dissipation, and the decoupling and disturbance-suppression block 12 enables passage of the excitation pulses towards the first node N1 (one of the diode elements 15a, 15b is in the conduction state, according to the polarity of the pulses).

During the subsequent receiving phase, when the transmitter stage 3 is deactivated (for example, set in the high-impedance state), the biasing block 11 is activated (the biasing switch 14 is driven into the closed state by the control signal $S_{14}$), in such a way as to set biasing of the output terminal 3a (in particular to a value close to the reference voltage GND) and thus prevent the output terminal 3a itself from being into an indeterminate condition.

The biasing block 11 thus facilitates rejection of disturbance, in particular the disturbance deriving from the presence of the distinct transceiver channels of the probe (for which it imposes, in fact, a common biasing, in the example at the reference terminal GND), and prevents the same disturbance from taking the first node N1 of the CMUT transducer 2 to a voltage different from the one envisaged during the receiving phase. In other words, the biasing block 11 facilitates a very high rejection in regard to the disturbance coming from the first supply HV (and/or −HV, if present).

During the receiving phase, the decoupling and disturbance-suppression block 12 further enables decoupling of the parasitic capacitances associated to the transmitter stage 3. The pair of diode elements 15a, 15b behaves, in fact, as a resistance of high value and as a capacitance of low value in series with the aforesaid parasitic capacitances (in this way, substantially cancelling out the effects in regard to the first node N1). The diode elements 15a, 15b are further appropriately sized for bringing the first node N1, during the receiving phase, to a desired voltage, which prevents the signal received from being distorted.

The transceiver circuit 10 further includes a receiver stage 16, coupled to a second supply voltage LV (low voltage, e.g., with logic voltage values for example in the range of 1V-3V or 1V-5V), and provided, according to an embodiment, with at least one first gain stage including a charge amplifier 17, which may be selectively connected, during a receiving phase, to the first node N1 via a transmission/reception switching stage 18 (in what follows T/R switching stage 18). It is evident that the receiver stage 16 may further comprise further gain stages or, in general, further stages for processing the signals received (in a way not illustrated herein).

The charge amplifier 17 has a feedback capacitor 19 connected between a respective input terminal 17a and a respective output terminal 17b, and is further coupled to a biasing line 20, set at a biasing voltage $V_b$, in the low-voltage range. In an embodiment, the biasing voltage $V_b$ has a value intermediate between the reference voltage GND and the second supply voltage LV.

Figure 4:
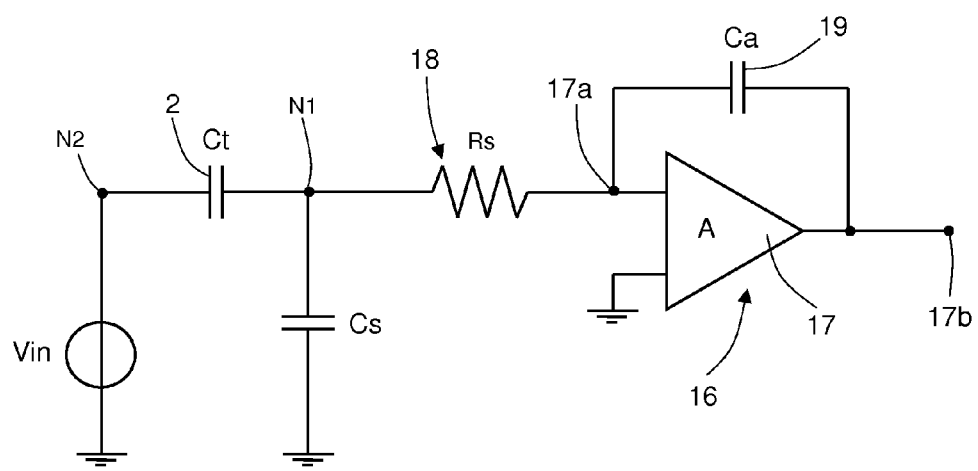
FIG. 4 is a representation of an equivalent electrical circuit of a portion of the transceiver circuit.

FIG. 4 shows the equivalent circuit of the charge amplifier 17 during the receiving phase; the series resistance $R_s$ of the T/R switching stage 18 and the parasitic capacitance $C_s$ of the T/R switching stage 18 towards the reference terminal GND are indicated in FIG. 4. The equivalent-voltage generator connected to the second node N2 of the CMUT transducer 2, for determination of the corresponding transfer function, is designated by $V_{eq}$.

The transfer function A of the charge amplifier 17 is given by the following expression:

$$A = -\frac{C_t}{C_a} \cdot \frac{1}{1 + R_s \cdot (C_t + C_s)}$$

where $C_t$ is the intrinsic capacitance of the CMUT transducer 2, and $C_a$ is the capacitance of the feedback capacitor 19.

The parasitic capacitance $C_s$ of the T/R switching stage 18 has a low impact on the transfer function of the charge amplifier 17 as compared to the series resistance $R_s$ of the T/R switching stage 18. Reducing the series resistance $R_s$ may improve performance both in terms of noise introduced and in terms of bandwidth. Sizing of the T/R switching stage 18 is not critical.

In an embodiment, and as illustrated schematically in the aforesaid FIG. 2, the T/R switching stage 18 is further coupled, or referred, to the same biasing line 20 as that of the charge amplifier 17, set at the biasing voltage $V_b$.

As will be described in detail, in an embodiment the above configuration facilitates reduction of phenomena of charge injection associated to switching of the T/R switching stage 18 in the transition from the transmitting to the receiving phase, in this way increasing the speed of response of the transceiver circuit 10.

Figure 5:
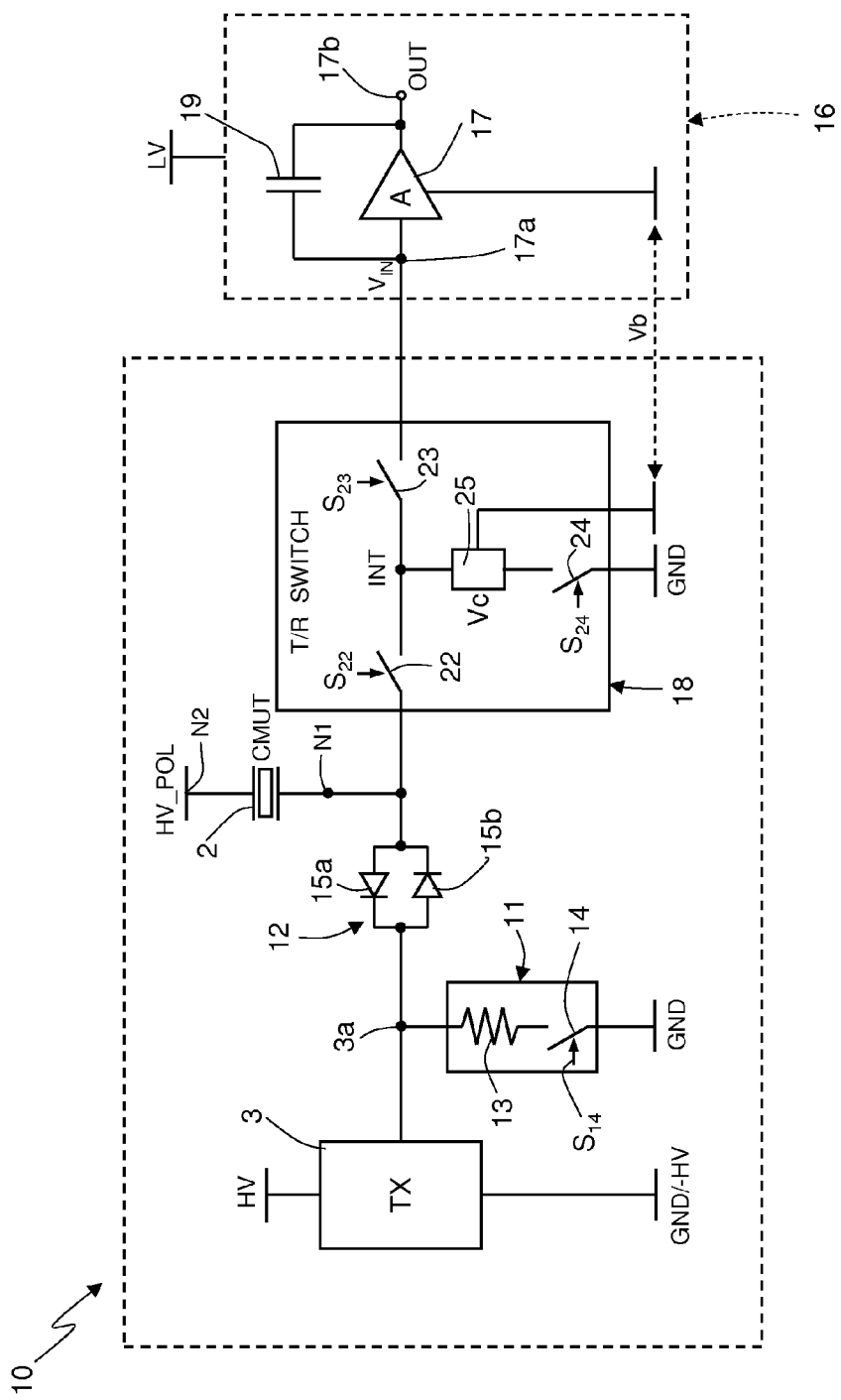
FIG. 5 shows a more detailed block diagram of a transceiver circuit for a CMUT transducer, according to an embodiment.

In an embodiment (illustrated in FIG. 5), the T/R switching stage 18 comprises: a first switch 22, of the high-voltage type (e.g., provided by a transistor that is able to withstand high voltages, for example of the order of the first supply voltage HV), connected between the first node N1 of the CMUT transducer 2 and an intermediate node INT, internal to the T/R switching stage 18; a second switch 23, of the low-voltage type (e.g., provided by a transistor that is able to withstand voltages not higher than a low voltage, for example of the order of the second supply voltage LV), connected between the intermediate node INT and the input terminal 17a of the charge amplifier 17 (thus, to the input of the receiver stage 16); and further a third switch 24, which is also of the low-voltage type, having a first terminal connected to the reference terminal GND and a second terminal connected to the same intermediate node INT via a generator block 25, configured to generate an appropriate clamping voltage $V_c$ starting from the biasing voltage $V_b$.

In particular, during operation, the input terminal 17a of the charge amplifier 17 is designed to be set at an operating voltage $V_{IN}$, which is a function of the biasing voltage $V_b$ and of the design characteristics of the charge amplifier 17.

The generator block 25 is configured to generate the clamping voltage $V_c$ in such a way that its value corresponds to the value of the aforesaid operating voltage $V_{IN}$. In particular, the value of the clamping voltage $V_c$ substantially coincides with the value of the operating voltage $V_{IN}$.

The first, second, and third switches 22, 23, 24 receive a respective control signal $S_{22}$, $S_{23}$, $S_{24}$, for example from the aforementioned control unit, which determines switching thereof according to an appropriate timing.

In general, operation of the T/R switching stage 18 envisages that, during the transmitting phase, the first switch 22 is open for decoupling the receiver stage 16 from the high voltage and from the disturbance generated by the transmitter stage 3, and that the second switch 23 is also open.

During the receiving phase, both the first switch 22 and the second switch 23 are instead closed for coupling the receiver stage 16 to the CMUT transducer 2 (and thus enable reception of the echoes generated by the ultrasounds emitted during the previous transmitting phase).

Furthermore, prior to start of the receiving phase (and thus alternatively: in a time interval comprised between the end of the transmitting phase and the aforesaid start of the receiving phase; or else during the transmitting phase itself, at the end thereof; or else in a time interval straddling the end of the transmitting phase and once again prior to start of the receiving phase), the third switch 24 is closed in such a way as to cause precharging of the internal node INT to the clamping voltage $V_c$.

In particular, the third switch 24 remains closed only for the time necessary for generating, at the internal node INT, a voltage the value of which corresponds to the clamping voltage $V_c$; this period of time is referred to as a precharge period.

In this way, when the second switch 23 is subsequently closed during the effective receiving phase, there is a substantially zero difference of potential across it, given that the internal node INT had previously been clamped at the clamping voltage $V_c$, which substantially coincides with the operating voltage $V_{IN}$ on the input terminal 17a of the charge amplifier 17.

It follows that, upon switching of the T/R switching stage 18, which determines transition from the transmitting phase to the receiving phase, the phenomenon of charge injection, which is responsible, as mentioned previously, for the delays in the response of the transceiver circuit 10, is absent (or is in any case very limited, e.g., minimized).

In an embodiment, the phenomenon of charge injection may be limited even further. The closing of the second switch 23 occurs upon (substantially at the same time as) opening of the third switch 24, in such a way that the charge determined by depletion of the channel due to opening of the third switch 24 creates the channel for closing the same second switch 23; this charge sharing means that there is little or no charge injection into the input terminal 17a of the charge amplifier 17.

Figure 6:
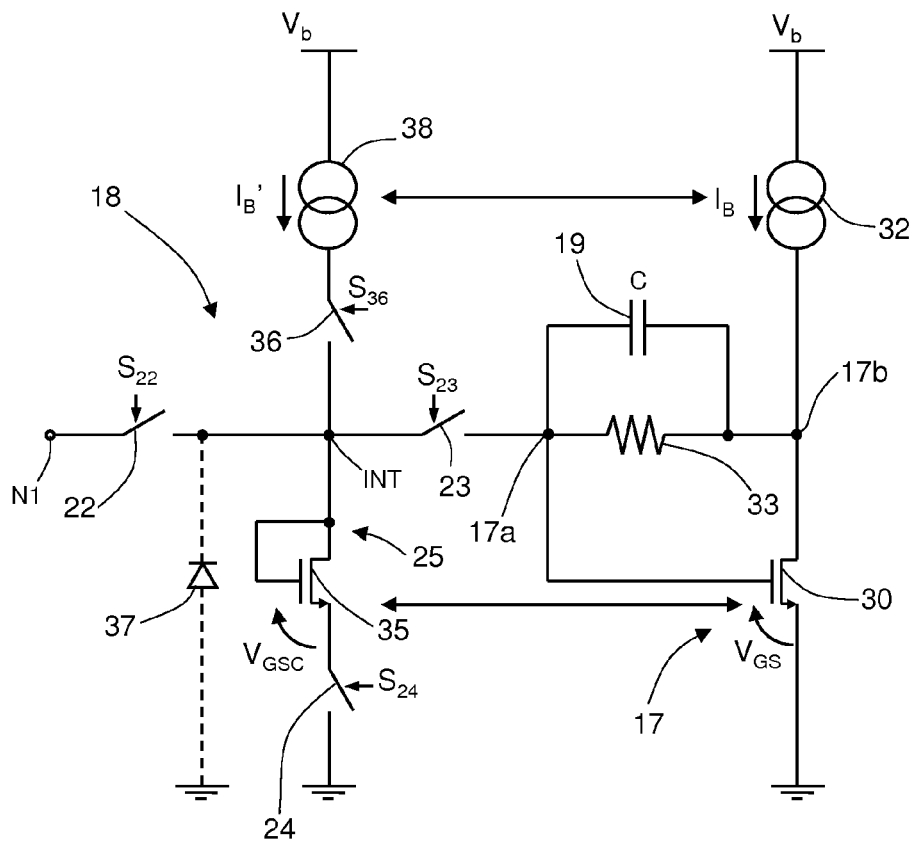
FIG. 6 shows the circuit diagram of a portion of the circuit of FIG. 5.

FIG. 6 shows in greater detail an embodiment, with particular reference to the T/R switching stage 18 and to the corresponding generator block 25.

In this embodiment, by way of example, the charge amplifier 17 has an input stage of the single-transistor type for reducing noise and comprises an NMOS transistor 30 having a gate terminal coupled to the input terminal 17a, a source terminal connected to the reference terminal GND, and the drain terminal coupled to a biasing generator 32, which supplies a biasing current $I_B$. The drain terminal of the NMOS transistor 30 further defines the output terminal 17b of the charge amplifier 17 (which, alternatively, may however comprise further amplification stages, in a per se known manner, here not illustrated).

Furthermore, FIG. 6 shows a biasing resistor 33, connected in parallel to the feedback capacitor 19, between the input and output terminals 17a, 17b of the charge amplifier 17.

The generator block 25 of the T/R switching stage 18 comprises in this case: a copy block 35, a precharge switch 36; a diode 37; and a precharge generator 38, which supplies a precharge current $I_B'$, which is a function of the biasing current $I_B$ and of the operating conditions.

In this embodiment, the precharge generator 38 is controlled by the biasing generator 25 in such a way that between the precharge current $I_B'$ and the biasing current $I_B$ a precharge relation stands. For instance, the precharge generator 38 and the biasing generator 25 form a current-mirror circuit, not necessarily with unit mirror-ratio.

The copy block 35 is set in series to the third switch 24, between the intermediate node INT and the reference terminal GND.

The precharge switch 36 is set between the precharge generator 38 and the intermediate node INT, and is controlled by a respective control signal $S_{36}$ coming, for example, from the control unit, which determines switching thereof according to an appropriate timing.

Diode 37 has its anode terminal connected to the reference terminal GND and its cathode terminal connected to the intermediate node INT.

In greater detail, the copy block 35 has a structure substantially similar to the amplification input stage of the charge amplifier 17, but for a possible scale factor.

In particular, the copy block 35 is configured so that a control voltage VGSC of the copy block 35 is substantially equal to a control voltage VGS of the amplification input stage of the charge amplifier 17, when the biasing current $I_B$ of the amplification input stage and the precharge current $I_B'$ of the copy block 35 are in the precharge relation with respect to one another.

In particular, the control voltage VGSC coincides with the aforementioned clamping voltage $V_c$, whereas the control voltage VGS coincides with the aforementioned operating voltage $V_{IN}$.

In this embodiment, the copy block 35 comprises an NMOS transistor in diode configuration, having its source terminal connected to the reference terminal GND through the third switch 24, and its drain and gate terminals both coupled to the intermediate node INT. For instance, the NMOS transistor has an aspect ratio (W/L)' equal to a multiple N of the aspect ratio (W/L) of the NMOS transistor 30 of the amplification input stage, and the mirror ratio between the precharge current $I_B'$ of the copy block 35 and the biasing current $I_B$ of the amplification input stage is equal to the same multiple N.

In this embodiment, during the precharge period, the third switch 24 and the precharge switch 36 are driven into the closed condition, thus connecting the precharge generator 38 to the copy block 35.

The precharge current $I_B'$ is thus forced through the copy block 35 and imposes a value of the control voltage VGSC equal to the value of the control voltage VGS of the amplification input stage of the charge amplifier 17. The precharge current $I_B'$ and the biasing current $I_B$ are in fact in the precharge relation, irrespective of possible fluctuations of the biasing current $I_B$, thanks to the fact that the precharge generator 38 is controlled by the biasing generator 32.

The precharge switch 36 is kept closed for a precharge period ΔT sufficient to enable the control voltage VGSC of the NMOS transistor forming the copy block 35, and consequently the voltage on the intermediate node INT, to stabilize at the value of the control voltage VGS of the amplification input stage. The duration of the precharge period ΔT depends, in particular, upon the precharge current $I_B'$.

As already highlighted, the phase of precharging of the intermediate node INT may start even before the first switch 22 is closed to determine the end of the transmitting phase. Consequently, according to the design choices (e.g., in practice according to the precharge relation between the precharge current $I_B'$ and the first biasing current $I_B$), the precharge switch 36 may possibly be closed while the first switch 22 is still open.

Once the precharge period ΔT has elapsed, the second switch 23 and the third switch 24 are simultaneously switched (switching of the second switch 23 determining start of the receiving phase).

The above switching is made in such a way as to cause a process of charge sharing between the third switch 24, which is initially closed and is then opened, and the second switch 23, which is initially open and is then closed. In particular, the charge initially stored for forming the channel of the third switch 24 (a MOS transistor that turns off) is released and comes to form the channel of the second switch 23 (a MOS transistor that goes into conduction). In this way, there is a further reduction (e.g., a minimization) in the injection of charge into the amplification input stage of the charge amplifier 17, thus reducing sensitivity to noise and without delaying as a whole switching of the T/R switching stage 18.

Charge sharing may further be obtained by driving the control terminals of the switches for obtaining a slow transition. In other words, applied to the control terminals of the switches are ramp voltages of the duration of some nanoseconds instead of voltages substantially of the step type (in practice, of the duration of tens or hundreds of picoseconds).

Figure 7:
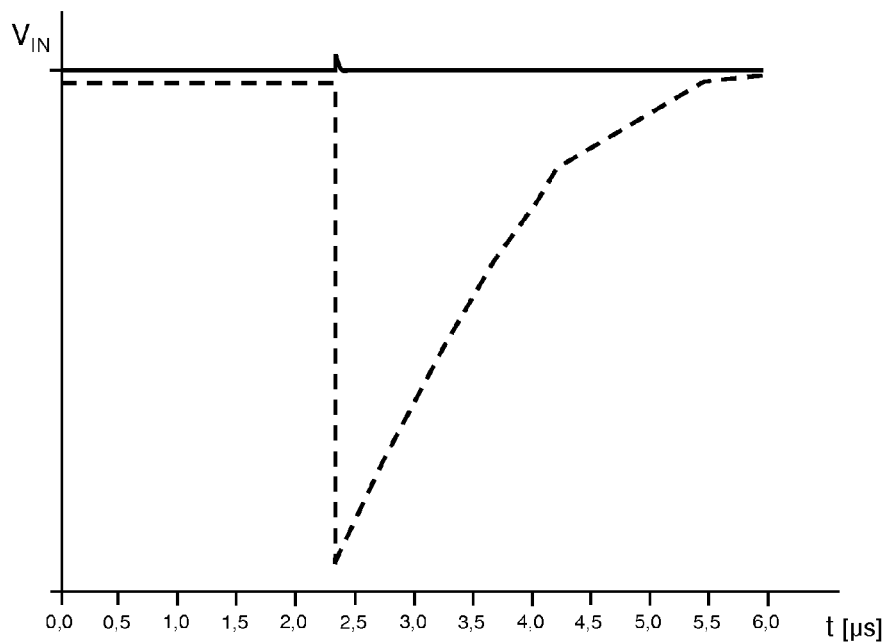
FIG. 7 is a plot of an electrical quantity for the circuit of FIG. 6.

FIG. 7 shows, by way of example, the voltage $V_{IN}$ at input 17a to the first amplification stage of the charge amplifier 17, upon transition from the transmitting configuration to the receiving configuration, respectively in the presence (solid line) and in the absence (dashed line) of the precharge mechanism discussed above.

It is emphasized that the precharge phase may also be interrupted to reduce power consumption. Furthermore, thanks to control of the precharge current $I_B'$ according to the precharge relation, the level of precharge voltage that may be obtained on the intermediate node INT is accurate. The precharge relation may then be selected in a flexible way to obtain the desired balance between rapidity of switching (higher precharge current $I_B'$ and shorter precharge period ΔT) and reduction of consumption (lower precharge current $I_B'$ and longer precharge period ΔT).

Figure 8:
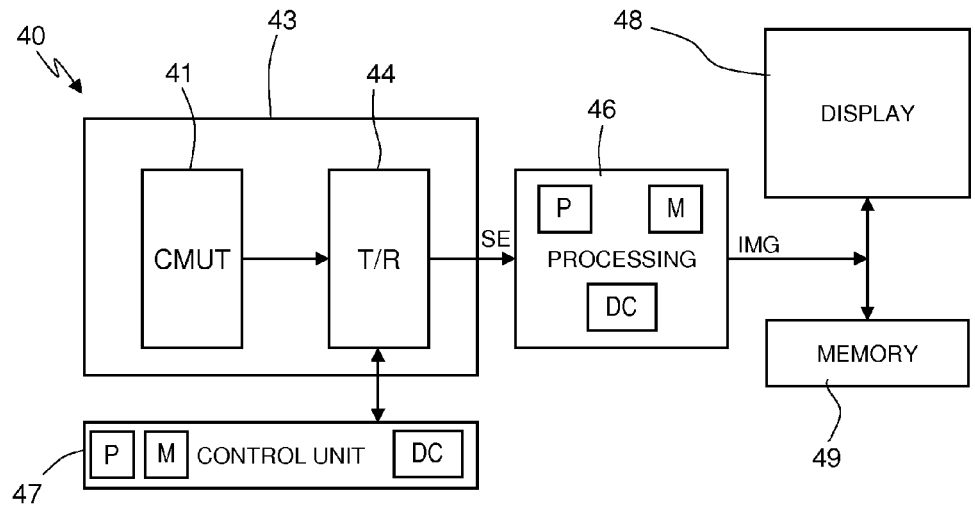
FIGS. 8 and 9 are schematic block diagrams regarding an electronic device incorporating an array of CMUT transducers, according to an embodiment.

With reference to FIG. 8, a possible application of the transceiver circuit 10 in an electronic device 40 is now discussed, for example a medical-diagnostics device, such as a ultrasonographic scanner or ultrasonic tomography scanner.

In the above FIG. 8, an ultrasonic probe for ultrasonography or ultrasonic tomography is illustrated schematically and designated as a whole by the reference number 41.

The probe 41 comprises an array of ultrasonic transducers (each provided as described previously for the CMUT transducer 2), housed in a package 43, transceiver circuits, designated as a whole by 44 (each provided as described in detail previously for the transceiver circuit 10), and a control unit 47.

The probe 41 and the transceiver circuits 44 may be integrated in a same die or, alternatively, provided on one or more distinct dice. Advantageously, the transceiver circuits may be housed within the package 43.

The transceiver circuits 44 are coupled to a processing unit 46 to supply echo signals SE indicating return echoes picked up by the CMUT transducers.

The processing unit 46 receives and processes the echo signals SE for generating sonographic images IMG that may be displayed on a screen 48 and/or stored in a mass memory 49.

As illustrated, the control unit 47 and the processing unit 46 comprise one or more processors P, one or more memories M, and discrete circuitry DC, which may be used alone or in various combinations to implement the respective functions of the control unit 47 and the processing unit 46.

Figure 9:
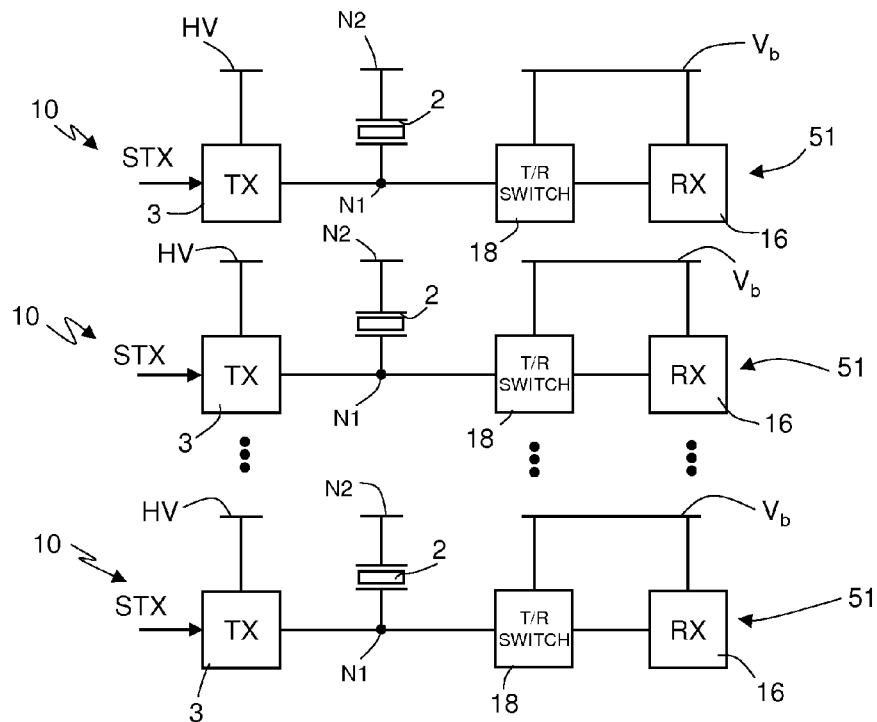

As illustrated in FIG. 9, the CMUT transducers 2 and the corresponding transceiver circuits 10 are arranged for forming a plurality of transmission/reception channels 51, each of which comprises a CMUT transducer 2, a transmitter stage 3, a T/R switching stage 18, and a receiver stage 16.

In a different embodiment (not illustrated), one or more transmitter stages 3 and/or receiver stages 16 may be shared, for example with time sharing by a multiplexer, among a number of CMUT transducers 2.

In each channel 51, the CMUT transducer 2 has a respective first terminal coupled to a first node N1 (a reception/transmission node) and a second terminal coupled to a second node N2, which constitutes a common reference node for the CMUT transducers 2 of all the channels 51 and is set at a biasing voltage HV_POL (as discussed previously).

An embodiment may provide a complete transmission and reception architecture that may be coupled to one or more CMUT transducers, has a compact structure and a low complexity, which may facilitate one or more of the following features:

use of the intrinsic capacitance of the CMUT transducers for providing the corresponding gain stage;

protection of the accessible electrode of the CMUT transducers from capacitive couplings between adjacent channels;

minimization of charge injection;

minimization of the switching time between the transmission and receiving phases;

sizing of the T/R switching stage with low impact on the bandwidth and with reduction of the series resistance and of the impact on noise performance;

possibility of using, with minimal changes, unipolar or bipolar transmission pulses during transmission; and possibility of rendering the DC biasing of the CMUTs independent of operation of the integrated transceiver circuit.

As emphasized previously, it is evident that the circuit and architecture described may also find a wide range of applications, in combination with ultrasonic transducers, not only in the field of medical diagnostics.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a transmitter configured to generate an excitation signal for a first node of a transducer during a transmitting phase, a second node of said transducer being coupled to a biasing voltage terminal;
a receiver including a charge amplifier having an input terminal and biased as a function of an amplifier biasing voltage; and
switching circuitry coupled to the amplifier biasing voltage and configured to:
generate a pre-charge biasing voltage based on the amplifier biasing voltage during a pre-charge phase;
couple the receiver to said first node during a receiving phase; and
decouple the receiver from said first node during the transmitting phase.

2. The device of claim 1, comprising:
decoupling circuitry coupled between an output terminal of said transmitter and said first node and configured to decouple the transmitter from said first node during the receiving phase; and
transmitter biasing circuitry coupled to said output terminal and configured to set a voltage of said output terminal to a reference voltage value during said receiving phase.

3. The device of claim 2 wherein said decoupling circuitry comprises a pair of diodes in antiparallel configuration, connected between said output terminal and said first node and biased during said receiving phase.

4. The device of claim 2 wherein said transmitter biasing circuitry comprises a switch and a high-impedance element, connected in series between said output terminal and a line set at said reference voltage, said switch being configured to open during said transmitting phase and to close during said receiving phase.

5. The device of claim 2 wherein said switching circuitry comprises an intermediate node and is configured to charge the intermediate node to the pre-charge biasing voltage during the pre-charge phase and to couple the amplifier input terminal to the intermediate node during the receiving phase.

6. The device of claim 1 wherein said switching circuitry comprises an intermediate node and is configured to charge the intermediate node to the pre-charge biasing voltage during the pre-charge phase and to couple the amplifier input terminal to the intermediate node during the receiving phase.

7. The device of claim 6 wherein said switching circuitry comprises:
a first switch configured to selectively coupled the first node to the intermediate node;
a second switch configured to selectively couple the intermediate node to the input terminal of the charge amplifier;
a biasing-voltage generator coupled to the intermediate node and configured to generate the pre-charge biasing voltage based on said amplifier biasing voltage; and
a third switch coupled between a reference voltage terminal and the biasing-voltage generator and configured to selectively activate the biasing-voltage generator during the pre-charge phase.

8. The device of claim 7 wherein,
the receiver comprises a biasing-current generator coupled to the biasing voltage and configured to supply a biasing current, wherein the charge amplifier is configured to generate an operating voltage on the input terminal based on the biasing current; and
the biasing-voltage generator comprises: a pre-charge-current generator, which is coupled to the biasing generator and configured to supply a pre-charge current, wherein the biasing-voltage generator is configured to provide the pre-charge biasing voltage on the intermediate node based on the pre-charge current, said pre-charge biasing voltage having a pre-set relation with said operating voltage.

9. The device of claim 8 wherein,
said charge amplifier includes a first transistor coupled to the biasing-current generator to receive the biasing current and having a control terminal coupled to the input terminal, and a first aspect ratio; and
said biasing-voltage generator comprises a fourth switch coupled between the intermediate node and the pre-charge-current generator, and a second transistor, coupled to the pre-charge-current generator to receive the pre-charge current, which is mirrored with respect to the biasing current via a mirror ratio, the second transistor having a control terminal coupled to the intermediate node and a second aspect ratio, wherein the second aspect ratio is a multiple of the first aspect ratio, the multiple being a function of the mirror ratio.

10. The device of claim 1 wherein the charge amplifier includes a feedback capacitor coupled between an output terminal of the charge amplifier and the input terminal of the charge amplifier.

11. The device of claim 1 wherein the transmitter operates at a first voltage and the receiver operates at a second voltage, lower than the first voltage, and the switching circuitry is configured to protect the receiver stage from the first voltage in the transmitter stage.

12. The device of claim 1 wherein the biasing voltage terminal is configured to receive a voltage from an external source.

13. The device of claim 1 wherein charge amplifier has a biasing terminal amplifier coupled to the amplifier biasing voltage and separate from the input terminal of the charge amplifier.

14. A system, comprising:
an ultrasonic probe including a plurality of transducers arranged in an array and a corresponding plurality of transceiver circuits, each transceiver circuit having:
a transmitter configured to generate an excitation signal for a first node of a transducer during a transmitting phase, a second node of said transducer being coupled to a biasing voltage terminal;
a receiver including a charge amplifier having an input terminal and biased as a function of an amplifier biasing voltage; and switching circuitry coupled to the amplifier biasing voltage and configured to:
generate a pre-charge biasing voltage based on the amplifier biasing voltage during a pre-charge phase;
couple the receiver to said first node during a receiving phase; and
decouple the receiver from said first node during the transmitting phase; and
a controller configured to control timing of the receiving and transmitting phases of each of said transceiver circuits.

15. The system of claim 14 wherein each transceiver circuit comprises:
decoupling circuitry coupled between an output terminal of the transmitter and the first node and configured to decouple the transmitter from the first node during the receiving phase of the respective transceiver; and
transmitter biasing circuitry coupled to the output terminal and configured to set a voltage of the output terminal to a reference voltage value during the receiving phase of the respective transceiver.

16. The system of claim 14 configured to perform at least one of ultrasonography and ultrasonic tomography.

17. A method, comprising:
transmitting an excitation signal of a transmitter to a first node of a transducer during a transmitting phase, a second node of said transducer being coupled to a biasing voltage terminal;
biasing a charge amplifier of a receiver as a function of an amplifier biasing voltage, the charge amplifier having an input terminal;
generating a pre-charge biasing voltage based on the amplifier biasing voltage during a pre-charge phase;
coupling the receiver to said first node during a receiving phase; and
decoupling the receiver from said first node during the transmitting phase.

18. The method of claim 17, comprising:
decoupling an output terminal of the transmitter from said first node during the receiving phase; and
clamping a voltage of said output terminal to a reference voltage value during said receiving phase.

19. The method of claim 18 wherein said clamping comprises controlling a switch coupling said output terminal to a reference voltage line through a high-impedance element.

20. The method of claim 19, comprising charging an intermediate node to the pre-charge biasing voltage during the pre-charge phase and coupling the amplifier input terminal to the intermediate node during the receiving phase.

21. The method of claim 17, comprising charging an intermediate node to the pre-charge biasing voltage during the pre-charge phase and coupling the amplifier input terminal to the intermediate node during the receiving phase.

22. A non-transitory computer-readable medium having contents which configured a transducer system to perform a method, the method comprising:
transmitting an excitation signal of a transmitter to a first node of a transducer of the transducer system during a transmitting phase, a second node of said transducer being coupled to a biasing voltage terminal;
biasing a charge amplifier of a receiver as a function of an amplifier biasing voltage;
generating a pre-charge biasing voltage based on the amplifier biasing voltage during a pre-charge phase;
coupling the receiver to said first node during a receiving phase; and
decoupling the receiver from said first node during the transmitting phase.

23. The medium of claim 22 wherein the method comprises:
decoupling an output of the transmitter from said first node during the receiving phase; and
clamping a voltage of said output terminal to a reference voltage value during said receiving phase.

24. The medium of claim 22 wherein the method comprises charging an intermediate node to the pre-charge biasing voltage during the pre-charge phase and coupling an input terminal of the amplifier to the intermediate node during the receiving phase.

* * * * *

UNITED STATES PATENT AND TRADEMARK OFFICE
CERTIFICATE OF CORRECTION

PATENT NO. : 10,145,728 B2
APPLICATION NO. : 14/750312
DATED : December 4, 2018
INVENTOR(S) : Antonio Davide Leone et al.

It is certified that error appears in the above-identified patent and that said Letters Patent is hereby corrected as shown below:

On the Title Page

Page 2, Column 2, Item (56) References Cited:
"Guinn et al., "Front-End Receiver Electronics for High-Frequency Monolithic CMUT-on-CMOS Imaging Arrays." IEEE Transaction on Ultrasonics, Ferroelectrics, and Frequency Control 58(8):1658-1669, 2011."
Should read:
--Gurun et al., "Front-End Receiver Electronics for High-Frequency Monolithic CMUT-on-CMOS Imaging Arrays," IEEE Transaction on Ultrasonics, Ferroelectrics, and Frequency Control 58(8):1658-1669, 2011.--

Signed and Sealed this
Second Day of July, 2019

Andrei Iancu
*Director of the United States Patent and Trademark Office*